June 4, 1929.　　　M. A. SCHWARTZ　　　1,716,091
DISTORTION MOTOR
Filed Jan. 11, 1928　　　2 Sheets-Sheet 1

Inventor
M. A. Schwartz
by Hazard and Miller
Attorneys

June 4, 1929.  M. A. SCHWARTZ  1,716,091
DISTORTION MOTOR
Filed Jan. 11, 1928  2 Sheets-Sheet 2

Inventor
M. A. Schwartz.
by Hazard and Miller
Attorneys

Patented June 4, 1929.

1,716,091

UNITED STATES PATENT OFFICE.

MORRIS A. SCHWARTZ, OF LOS ANGELES, CALIFORNIA.

DISTORTION MOTOR.

Application filed January 11, 1928. Serial No. 245,899.

My invention is a distortion motor operating by distorting the magnetic field due to changing the magnetic permeability of the rotor of the motor.

An object of my invention is the construction of a distortion motor in which the windings of the rotor are heated electrically in order to change the magnetic permeability of such windings. In this and other respects my present invention distinguishes from my prior patent for magnetic distortion motor, Patent No. 1,431,545, issued October 10, 1922.

A further object of the present invention is the construction of a distortion motor in which the field is stationary, having a plurality of poles, and the armature form of winding rotates between these poles. The windings of the armature adjacent the poles are heated by means of movable contacts or brushes which directly engage these windings and transmit the current, heating a certain section of the windings. In this connection a further object of my invention is a construction for shifting the brushes so that the motor may be reversed.

A particular object in utilizing of electrically developed heat for changing the magnetic permeability of the metal of the rotor is to obtain a quick change of temperature at about the critical temperature point of such metal where it rapidly changes from being magnetic to non-magnetic.

The fundamental features of my motor are illustrated in the accompanying drawings, in which.

Figure 1:
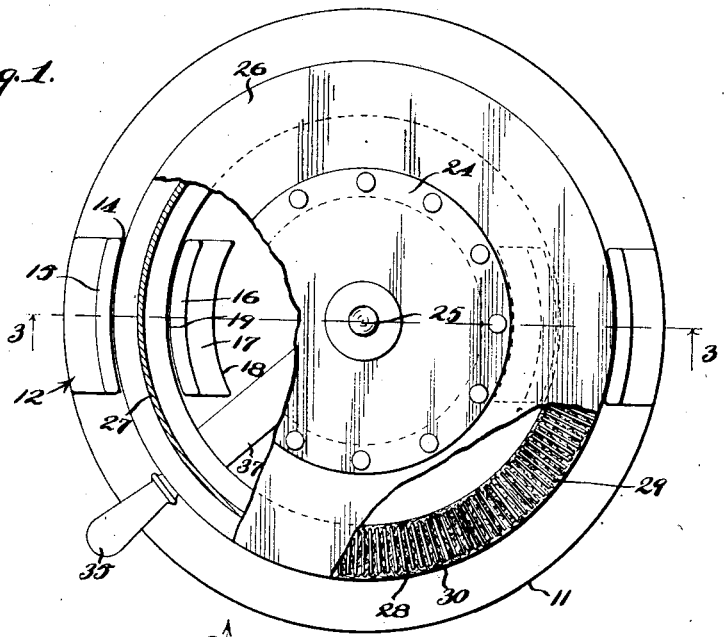
Figure 1 is a plan view of the motor as if taken in the direction of the arrow 1 of Fig. 2, partly broken away.
Figure 2:
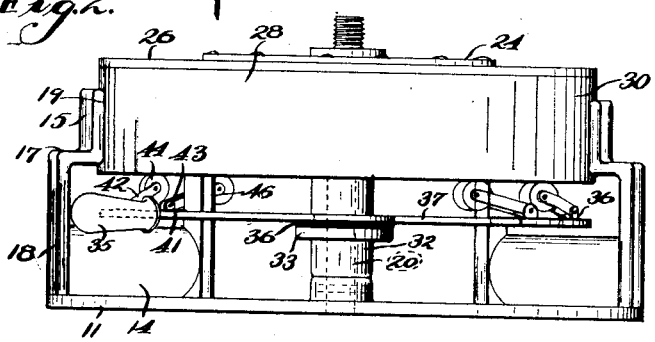
Fig. 2 is an elevation taken in the direction of the arrow 2 of Fig. 1.
Figure 3:
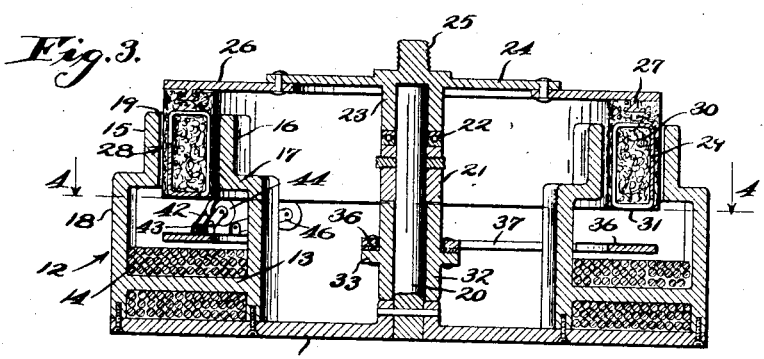
Fig. 3 is a vertical section on the line 3—3 of Fig. 1 in the direction of the arrows.

In constructing my motor I utilize a suitable base plate 11 with a plurality of pole pieces 12 connected thereto. These pole pieces have a core 13 on which there is a field winding 14 and also have poles of opposite polarity, 15 and 16. These pole pieces are bent inwardly, there being a horizontal shoulder 17˙ extending inwardly towards each other from the shanks 18 of the pole pieces. Each of the pole pieces has a curved face 19 concentric to the axis of the rotation of the armature, as hereunder set forth.

The armature mounting comprises a post 20 secured to the base 11 in any suitable manner and having a collar 21 fixed thereon, this fastening being shown by set-screws. On this collar there is an antifriction bearing 22; and resting on such bearing there is a rotary cap 23 having a disc 24 connected thereto and a screw-threaded end 25 to which may be connected a device for transmitting the power developed. A flat ring 26 is secured to the disc 24 by means of rivets or the like and has depending therefrom an inverted T-shaped bar 27. The armature 28 has windings 29 which are embedded in a heat insulating material 30; such heat insulating material is molded around the T-shaped bar 27 and functions to support the windings of the armature. The armature windings, however, are exposed on the lower surface 31 of this insulating material for a purpose hereunder set forth.

The arrangement for controlling and reversing the rotation of the armature is substantially as follows:

A rotatable collar 32 is mounted on a post 20 and has an annular shoulder 33 on which shoulder there is connected a cross bar 34 having a handle 35, there being an insulating strip 36 between the bar and the shoulder. Secured to opposite portions of the cross bar 34 there are arcuate arms 37 which have conducting wires 38 supported and attached thereto. These wires have terminals 39 and connect to the electric leads 40 for supplying current to the armature.

Figure 4:
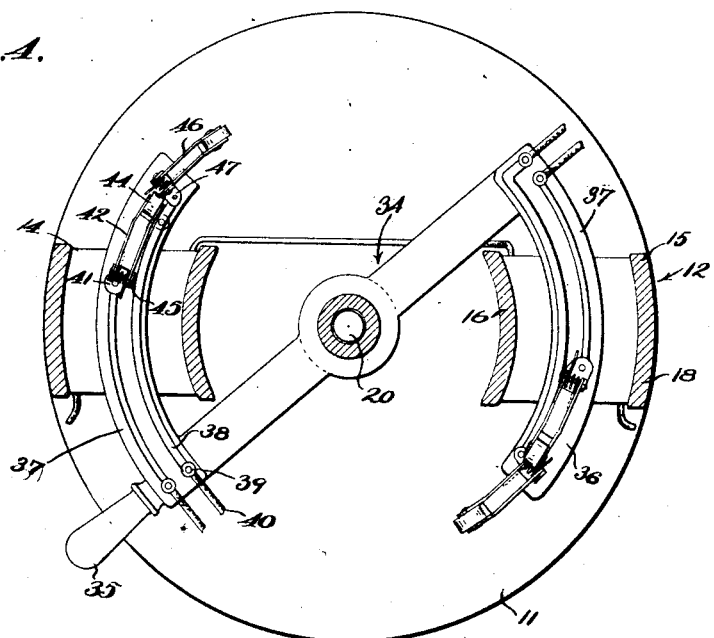
Fig. 4 is a transverse section on the line 4—4 of Fig. 3 in the direction of the arrows.
Figure 5:
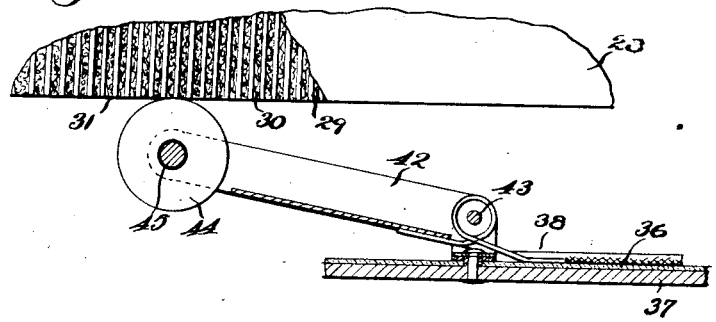
Fig. 5 is a detail elevation of one of the brushes illustrating the contact with the windings of the armature.

Secured to one of the wires 38 there is a terminal 41 in the form of a bracket having a trolley arm 42 connected thereto by a pivot 43 (note Figs. 4 and 5). Each of these trolleys has a roller 44 mounted on an axle 45 and form in effect brushes. The other wire of the two wires 38 has a similar type of brush designated generally by the numeral 46 except the shape of the bracket 41 is slightly different, this having a wider base 47, so that both the rollers 44 may follow in substantially the same track.

Figure 8:
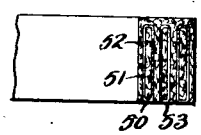
Fig. 8 is an alternative form of armature windings formed of a series of thin strips with windings thereon.

Figure 8 illustrates another form of constructing the armature and in this case there are series of thin ribbons 50 of insulating material and on each ribbon there is a winding 51 of wire. The pack is then made up of the ribbons formed into a circle, the whole assembly being embedded in heat insulating material 52 except that the lower bends 53 of the coils are exposed for contact with the roller brushes.

The manner of operation and functioning of my motor is substantially as follows:

In constructing the armature I preferably use a wire which has a relatively quick change of magnetic properties in accordance with changes of temperature within a limited range, and endeavor to operate the motor at substantially the critical temperature of change of such wires. For instance, I may utilize nickel wires in the armature, which, at a temperature of 270° F. are magnetic, and at a temperature of 300° F. are non-magnetic. Therefore, by rapidly changing the temperature between 270° and 300° these wires change in such a manner as to distort the lines of magnetic flux between the pole pieces.

Figure 6:
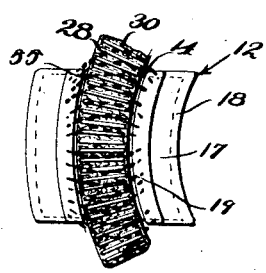
Fig. 6 is a diagrammatic horizontal section of the field poles and the rotor, illustrating the magnetic lines of flux when not distorted.

Referring to Fig. 6, the wires, metal strips, etc. of the rotor or armature are shown in a condition at the low temperature, in which they have magnetic properties and the lines of magnetic flux 55 are shown as traversing directly between the pole pieces and being equally balanced on both sides of the pole pieces, considered in a circumferential direction of the armature.

Figure 7:
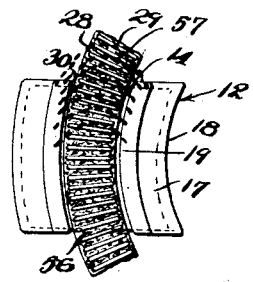
Fig. 7 is a view similar to Fig. 6 showing the magnetic lines of flux distorted.

In Fig. 7 it is presumed that the portion 56 of the rotor is heated to such a point that the metal does not have magnetic properties and therefore the magnetic lines of flux are distorted to a greater extent on one side, as indicated at 57, and at the desired temperature the lines of flux on the side 56 of the pole pieces may be negligible. Therefore, these unbalanced lines of flux exert a force to rotate the rotor.

As above mentioned, the current is carried to the windings of the rotor by means of the roller brushes so that short sections of the armature have an electric current passing therethrough which heats these wires sufficiently to change them from a magnetic to a non-magnetic condition. As these brushes are mounted on segmental arms 37 on the cross bar 34, these may be shifted by operating the handle 35 in relation to the field poles. Hence the amount of distortion of the magnetic flux may be varied in degree, and may also be shifted from one side of the pole pieces to mainly function on the opposite side by shifting the brushes so that they contact with the armature winding on the opposite side of the pole piece, this being done by rocking the handle 35.

It will be noted by my construction that when the motor is turning at a uniform speed the distance between the two brushes of one side is less than the distance between the two sets of brushes, considered in a circumferential direction. Therefore, the time of heating the wires of the rotor is shorter than the time given for these to cool prior to the next heating.

It is obvious that the form of rotor and the type of windings thereon may be materially changed, there being, however, some arrangement by which the wires or the metal of the rotor may be heated in short section.

Various changes may be made in the principles of my invention without departing from the spirit thereof, as set forth in the description, drawings and claims.

I claim:

1. A motor having an energized stator, a rotor having metal conductors therein, said conductors in one condition of temperature having properties of magnetic permeability and in a heated condition having such properties decreased or eliminated, means forming electrical connections between sections of the said metal conductors whereby said metal may be heated by an electric current passing therethrough.

2. A motor having an energized stator, a rotor having conducting metal therein, said metal in a relatively cooled condition having properties of magnetic permeability and in a heated condition having these properties decreased or eliminated, a pair of shiftable brushes positioned to form a contact with the conducting metal of the rotor and conduct a current to sections of said metal and thereby heat certain sections, thus changing the magnetic permeability.

3. A motor having a plurality of poles each having opposite pole pieces with means to energize said poles, a motor having conducting windings thereon, the windings passing between the said pole pieces, and electrical means to heat sections of the wire of the rotor and thereby distort the magnetic flux between the pole pieces.

4. A motor having poles of opposite polarity, with an armature having a conducting winding thereon, such winding passing between the poles, a pair of brushes engaging sections of the wire of the armature on its rotation, whereby electrical current transmitted through said brushes heats a section of the armature, whereby the magnetic flux between the poles is distorted.

5. A motor having a plurality of poles with pole pieces of opposite pieces of polarity, a rotor having a ring like armature with a conducting winding thereon, a plurality of pairs of brushes positioned to contact with sections of the wire of the armature whereby current through such brushes may heat sections of the armature winding, and thereby distort the magnetic flux between the pole pieces.

6. A motor, as claimed in claim 5, having in addition means to simultaneously shift the pairs of brushes to vary the magnetic flux or to reverse the position of such flux in reference to the pole pieces and thereby reverse the rotor.

7. A motor having a plurality of pairs of poles with pole pieces of opposite polarity, a rotor having a ring like armature, such armature having conducting windings, a pair of shiftable arms, each having a pair of brushes thereon with electrical connection thereto, said brushes contacting with sections of the winding of the armature, whereby said sections may be heated electrically and thereby distort the magnetic flux between the pole pieces.

8. A motor having a base with a plurality of energized poles having pole pieces of opposite polarity positioned thereon, a post having a rotor mounted thereon with a ring like armature formed of a conducting winding, the armature rotating between the pole pieces, and a plurality of brushes electrically connected positioned to engage sections of the windings of the armature and thereby heat such sections to distort the magnetic flux between the pole pieces.

9. A motor, as claimed in claim 8, a cross bar oscillatively mounted on the post and having a pair of arcuate arms, the said brushes being mounted on the arms whereby swinging of the bar shifts the brushes to vary the path of the magnetic flux or to reverse such path in reference to the pole pieces and thereby reverse the rotation of the rotor.

10. A motor having an energized stator, a rotor having conducting metal therein, such metal being mainly covered by heat insulating material with a part exposed, and brushes to engage sections of the exposed part of the metal and thereby heat sections of the metal whereby the magnetic flux passing between the stator and the rotor is distorted.

11. A motor having a plurality of energized poles, a rotor having an armature with a coil of wire, the main portion of said wire being embedded in a heat insulating material with a portion exposed, and energized brushes positioned to contact with sections of the exposed wire and thereby heat such sections whereby the magnetic flux between the poles and through the winding is distorted.

12. A motor having a base with a plurality of poles with pole pieces of opposite polarity mounted thereon, a post extending from the base and having a rotor mounted thereon with an armature secured to the rotor, the armature having conducting windings, said windings being embedded mainly in heat insulating material secured to the rotor with parts exposed, and a plurality of pairs of shiftable brushes, said brushes being positioned to engage sections of the windings and by an electric current transmitted through the brushes and such sections, to heat such sections whereby the magnetic flux between the pole pieces is distorted.

In testimony whereof I have signed my name to this specification.

MORRIS A. SCHWARTZ.